US006897819B2

(12) United States Patent
Henderson et al.

(10) Patent No.: US 6,897,819 B2
(45) Date of Patent: May 24, 2005

(54) APPARATUS FOR SHAPING THE RADIATION PATTERN OF A PLANAR ANTENNA NEAR-FIELD RADAR SYSTEM

(75) Inventors: Mark F. Henderson, Kokomo, IN (US); Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 20 days.

(21) Appl. No.: 10/670,431

(22) Filed: Sep. 23, 2003

(65) Prior Publication Data

US 2005/0062660 A1 Mar. 24, 2005

(51) Int. Cl.$^7$ ................................. H01Q 1/32
(52) U.S. Cl. ................ 343/713; 343/700 MS; 342/70
(58) Field of Search ................ 343/713, 872, 343/700 MS, 711, 712; 342/70, 71, 72; H01Q 1/32

(56) References Cited

U.S. PATENT DOCUMENTS

| | | | |
|---|---|---|---|
| 3,133,284 A | 5/1964 | Privett et al. | 343/782 |
| 3,775,769 A | 11/1973 | Heeren et al. | 343/100 SA |
| 3,852,762 A | 12/1974 | Henf et al. | 343/756 |
| 3,935,577 A | 1/1976 | Hansen | 343/781 |
| 3,979,755 A | 9/1976 | Sandoz et al. | 343/754 |
| 4,148,040 A | 4/1979 | Lunden et al. | 343/708 |
| 4,318,103 A | 3/1982 | Roettele et al. | 343/18 E |
| 4,977,407 A | 12/1990 | Crane | 343/753 |
| 5,248,977 A | 9/1993 | Lee et al. | 342/25 |
| 5,260,710 A * | 11/1993 | Omamyuda et al. | 342/70 |
| 5,530,651 A | 6/1996 | Uemura et al. | 364/461 |
| 5,905,457 A | 5/1999 | Rashid | 342/70 |
| 6,072,437 A | 6/2000 | Zimmerman et al. | 343/753 |
| 6,674,412 B1 * | 1/2004 | Schmidt et al. | 343/872 |

* cited by examiner

*Primary Examiner*—Hoanganh Le
(74) *Attorney, Agent, or Firm*—Stefan V. Chmielewski

(57) ABSTRACT

A near-field radar apparatus includes a fixed beam planar radar antenna and a radiation pattern adaptation device disposed substantially at the near-field boundary of the antenna. The adaptation device comprises a plurality of dielectric elements that individually constitute or approximate different surface portions of an idealized quasi-spherical or quasi-cylindrical radome reflector. The dielectric elements can be maintained physically separate or combined about the diffraction point of the antenna to form a single dielectric element. The dielectric elements may be mounted on a radome that is otherwise transparent to the radiation pattern, or otherwise suspended at or near the near-field boundary of the antenna.

8 Claims, 4 Drawing Sheets

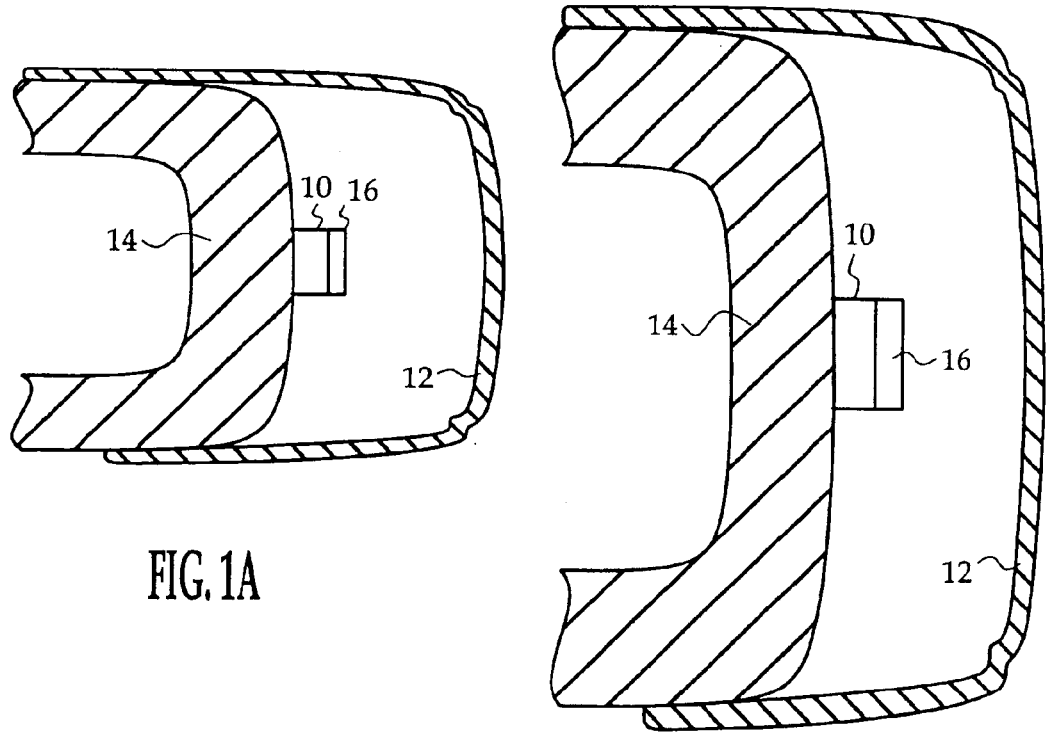
FIG. 1A
FIG. 1B
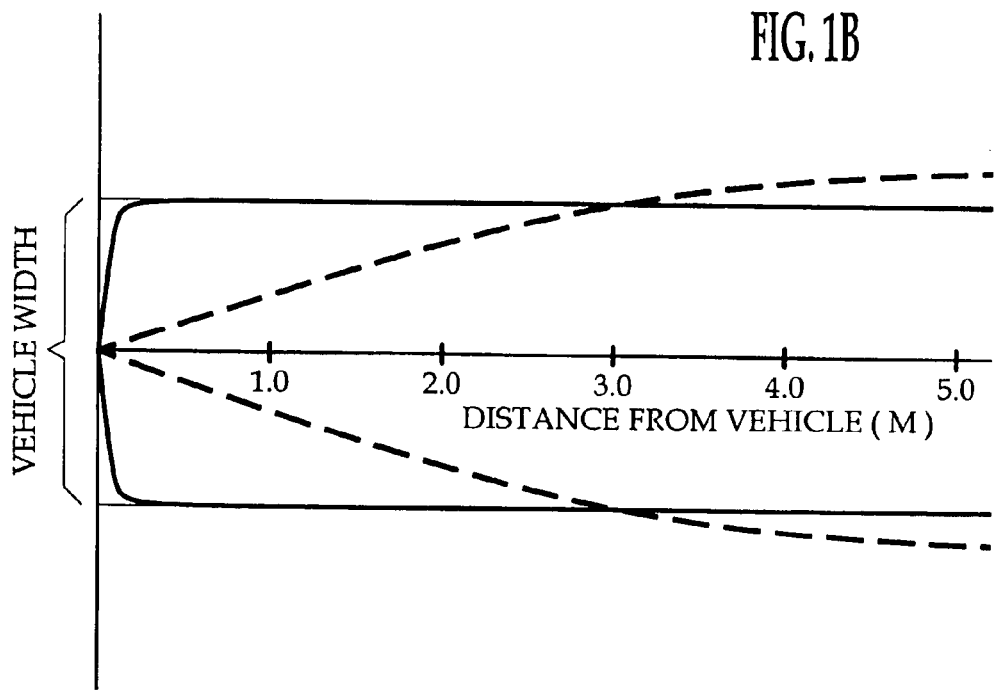
FIG. 2

APPARATUS FOR SHAPING THE RADIATION PATTERN OF A PLANAR ANTENNA NEAR-FIELD RADAR SYSTEM

TECHNICAL FIELD

The present invention is directed to near-field radar obstacle detection for vehicles, and more particularly to apparatus for shaping the radar radiation pattern of a planar radar antenna.

BACKGROUND OF THE INVENTION

Short-range obstacle detection for vehicle back-up and parking aid functions can be achieved with a wide-angle radar system, but cost and packaging considerations force design constraints that tend to limit the system performance. For example, cost considerations effectively rule out the use of multiple transceivers for meeting wide zone-of-coverage requirements, and both packaging and cost considerations effectively require the use of planar transmit and receive antennas, which in general are not well-suited to wide zone-of-coverage applications. Additionally, vehicle styling and design considerations frequently require the radar system to be mounted in a sub-optimal location (such as in the vehicle bumper) concealed behind vehicle trim panels that alter the radar radiation pattern.

A common approach for achieving the required zone-of-coverage in vehicle applications is to narrow the antenna radiation pattern and to radiate the specified zone-of-coverage by scanning. Another approach is to utilize custom-fabricated horns or non-planar antenna elements to broaden the radar field-of-view. However, such approaches are usually ruled out due to cost and packaging considerations. Accordingly, what is needed is an apparatus for shaping and broadening a planar antenna radar system field-of-view that is low cost and that does not significantly increase package size.

SUMMARY OF THE INVENTION

The present invention is directed to an improved near-field radar apparatus including a fixed beam planar radar antenna and a radiation pattern adaptation device disposed substantially at the near-field boundary of the antenna. The adaptation device comprises a plurality of dielectric elements that individually constitute or approximate different surface portions of an idealized-imaginary quasi-spherical or quasi-cylindrical radome reflector. The dielectric elements can be maintained physically separate or combined about the diffraction point of the antenna elements to form a single dielectric element. The dielectric elements may be mounted on a radome that is otherwise transparent to the radiation pattern, or otherwise suspended at or near the near-field boundary of the antenna. The dielectric elements may be simple and inexpensive to manufacture, and do not significantly impact the package size of the radar apparatus.

BRIEF DESCRIPTION OF THE DRAWINGS

The present invention will now be described, by way of example, with reference to the accompanying drawings, in which:

FIG. 1A is a cross-sectional side-view diagram of a vehicle bumper-mounted radar system including a radiation pattern adaptation device according to this invention.

FIG. 1B is a cross-sectional overhead view of the vehicle bumper-mounted system of FIG. 1A.

FIG. 2 is a graph depicting radiation patterns for the radar system of FIGS. 1A–1B, with and without the radiation pattern adaptation device.

DESCRIPTION OF THE PREFERRED EMBODIMENT

Figure 3:
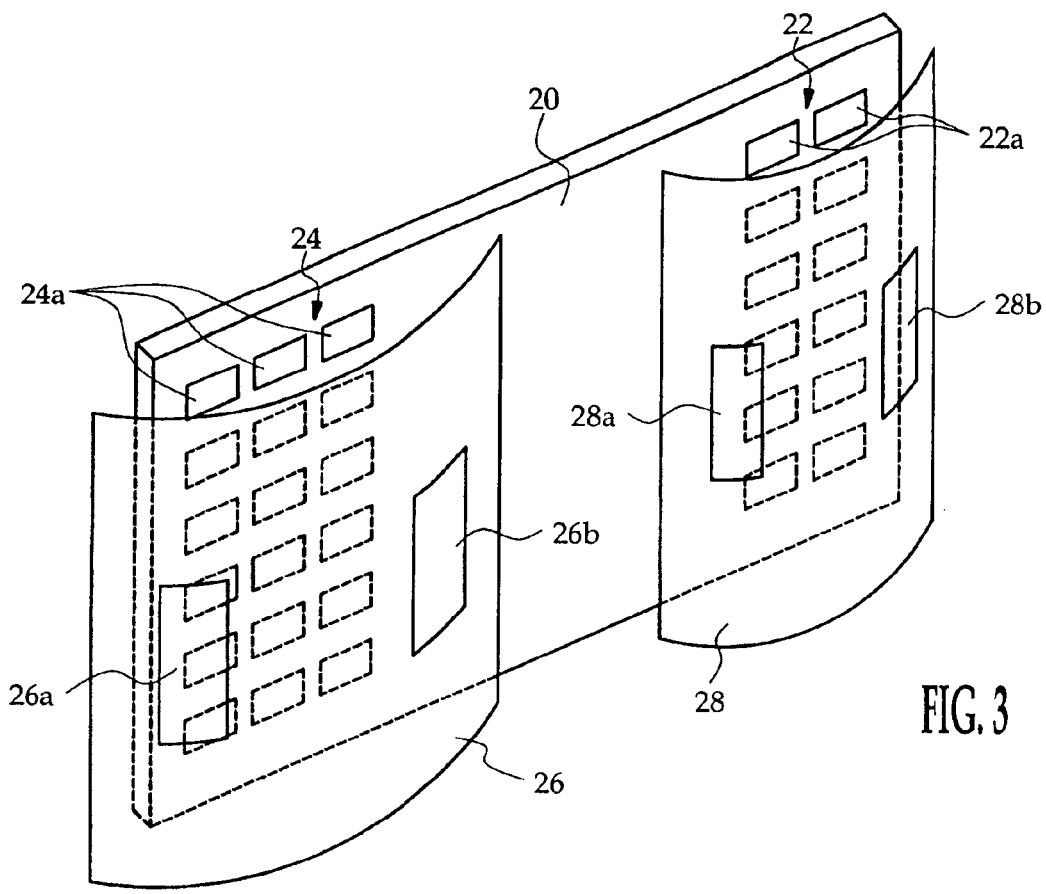
FIG. 3 depicts a planar antenna circuit board of the radar system of FIG. 1, along with idealized cylindrical reflectors.

The radar system of the present invention applies in general to the use of a fixed beam radar sensor in applications requiring a wide-angle zone-of-coverage. The invention is illustrated herein in the context of a vehicle back-up and parking aid, but is applicable to other vehicle systems such as frontal or side object detection systems, and also to non-vehicle systems.

FIGS. 1A–1B depict a bumper-mounted back-up aid mechanization where a fixed beam radar sensor 10 is concealed behind a plastic fascia 12 surrounding the bumper frame 14. The adaptation device of the present invention is designated by the reference numeral 16, and is disposed in front of the radar sensor 10. While FIGS. 1A–1B show the adaptation device 16 as being supported on the radar sensor 10, it should be understood that the adaptation device 16 may be supported independent of the radar sensor 10—for example, by the bumper frame 14 or the plastic fascia 12. In the illustrated back-up aid application, the adaptation device 16 functions to extend the azimuth angle field-of-view as graphically depicted in FIG. 2, where the dashed traces designate a normal radiation pattern (i.e., without the adaptation device 16) and the solid traces designate an expanded radiation pattern achieved with the adaptation device 16. In other applications, the adaptation device 16 may be used to extend the elevation angle field-of-view, or both azimuth angle and elevation angle fields-of-view. In general, extending the radiation field-of-view in this manner allows the use of an inexpensive fixed beam radar sensor 10 in wide-angle zone-of-coverage applications. Additionally, the adaptation device 16 compensates for anomalies due to the mounting location of the radar sensor 10 and the pattern-altering characteristics of the fascia 12. For example, the bore-sight of radar sensor 10 may be displaced from and not parallel with the longitudinal axis of the vehicle, the fascia 12 may be angled vertically or horizontally with respect to the bore-sight, and so on.

In a conventional fixed-beam radar system, the field-of-view can be extended using a quasi-cylindrical or quasi-spherical reflector at or near the near-field boundary of the radar antenna. In general, the near-field boundary is given by $(2*D/\lambda)$, where D is the aperture diameter of the antenna (i.e., the planar length of the antenna's active elements in the direction of interest) and $\lambda$ is the radar wavelength. The region between the near-field boundary and the antenna is referred to as the near-field region, and typically comprises an area within about two wavelengths of the antenna. A reflector at or near the near-field boundary has the effect of a slightly defocused lens, and the radar beams (transmitted and received) are refracted as they pass through the reflector, effectively extending the field-of-view. A typical application requiring an extended azimuth zone-of-coverage is depicted in FIG. 3, where the reference numeral 20 designates a radar sensor circuit board on which are formed two planar patch antennae: a transmit antenna 22 comprising the patch elements 22a, and a receive antenna 24 comprising the patch elements 24a. The transmit and receive reflector 28 and 26 are located at or near the near-field boundaries of the transmit and receive antennae 22 and 24, respectively, and each reflector 26, 28 is cylindrical or quasi-cylindrical. In certain situations, transmit and receive antennae 22, 24 may be combined, in which case only a single reflector is required. In applications requiring an extended elevation zone-of-coverage, the reflectors 26, 28 can be rotated by 90°, while in applications requiring extended azimuth and elevation zones-of-coverage, the reflectors can be spherical (or quasi-spherical) instead of cylindrical.

Figure 4:
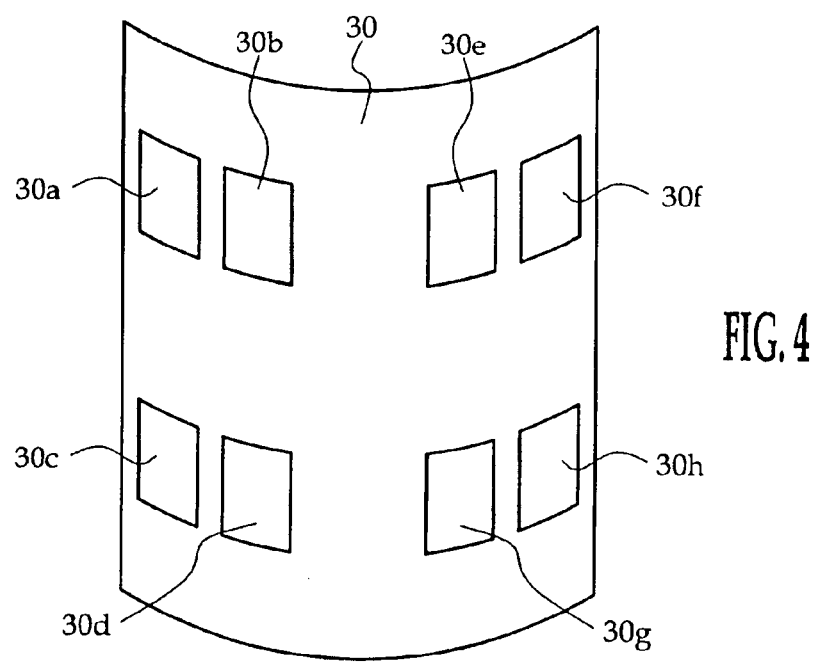
FIG. 4 depicts a first embodiment of the radiation pattern adaptation device of FIGS. 1A–1B.
Figure 5:
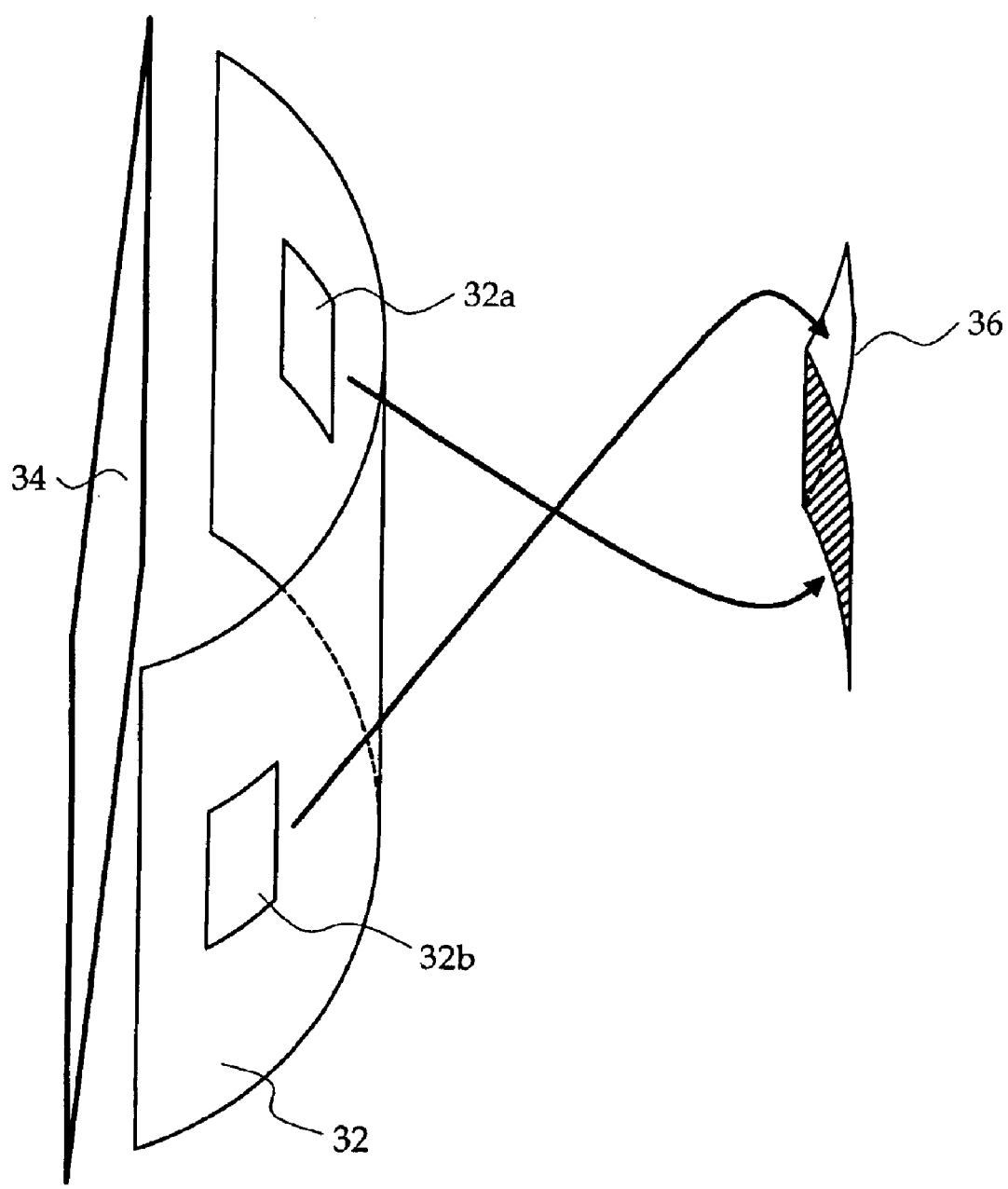
FIG. 5 depicts a second embodiment of the radiation pattern adaptation device of FIGS. 1A–1B.
Figure 6A:
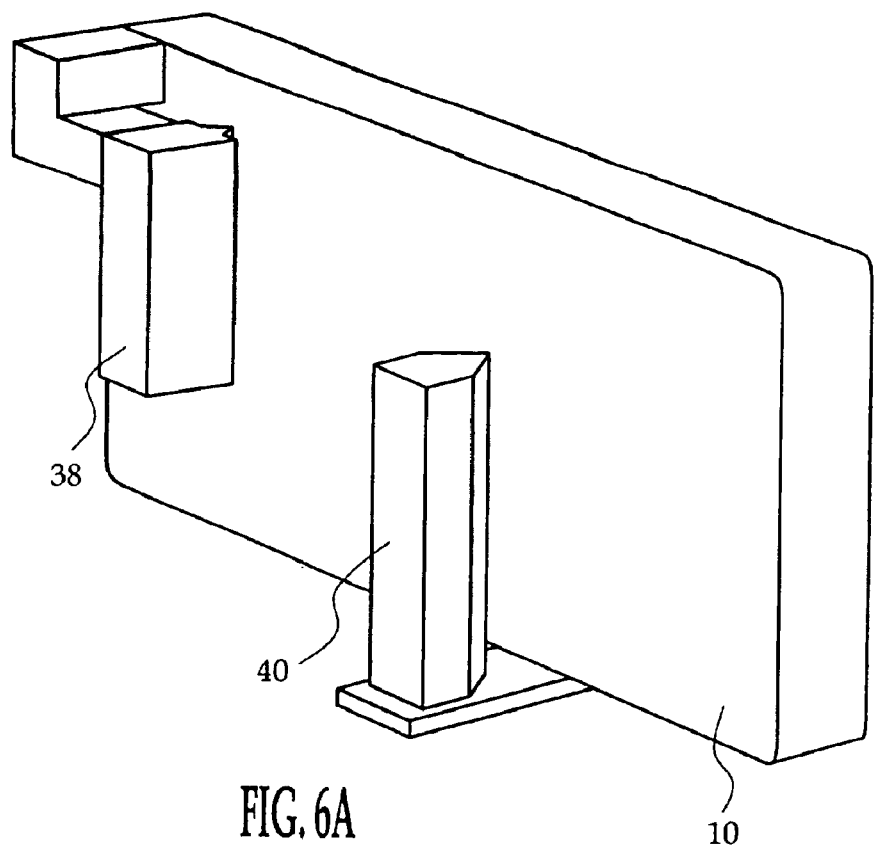
FIG. 6A depicts a mechanization of the radiation pattern adaptation device of FIG. 5 with the radar system of FIGS. 1A–1B.
Figure 6B:
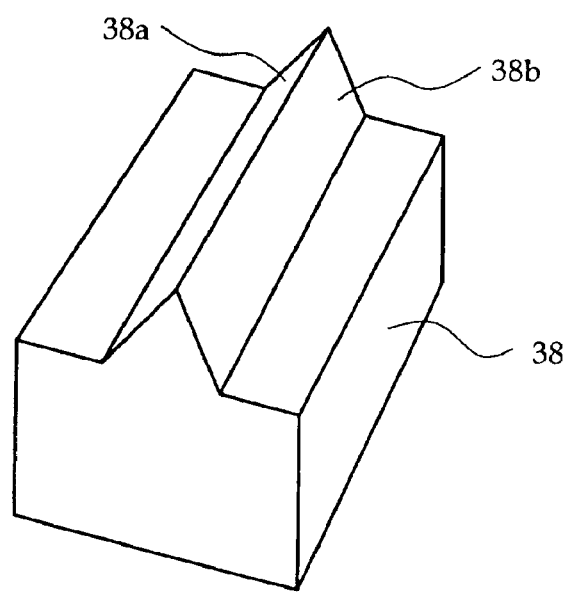
FIG. 6B details the radiation pattern adaptation device of FIG. 6A.

As indicated above, traditional cylindrical or spherical reflector elements (such as the reflectors 26 and 28 depicted in FIG. 3) are expensive to manufacture, and difficult to package in an environment such as depicted in FIG. 1. The present invention overcomes this problem through the recognition that the benefits achieved with traditional cylindrical or spherical reflectors can be achieved at a much lower cost with an adaptation device comprising a plurality of dielectric elements that individually constitute or approximate different surface portions of an idealized quasi-spherical or quasi-cylindrical reflector. This approach is illustrated in FIG. 3 by the dielectric elements 26a and 26b which constitute different surface portions of the reflector 26, and the dielectric elements 28a and 28b which constitute different surface portions of the reflector 28. In a preferred implementation, the elements 26a, 26b, 28a, 28b each represent only a small portion of the respective idealized reflectors 26, 28 so that they may be easily integrated into a radome that is otherwise transparent to the emitted and received radiation, and may be approximated as planar (i.e., non-curved) elements with negligible optical degradation. FIG. 4 depicts such an embodiment, where eight dielectric elements 30a, 30b, 30c, 30d, 30e, 30f, 30g, 30h are supported on a radome 30 that is otherwise transparent to the emitted and received radiation. Of course, the elements 30a-30h may be different in number and area than shown, and may be incorporated into radome 30 by an insert molding process if desired. Additionally, different dielectric elements such as the elements 32a and 32b can be combined within the diffraction or near-field region of an antenna 34 as illustrated in FIG. 5 to form a single multi-faceted dielectric element 36. As indicated in FIG. 5, the orientation of the individual dielectric elements 32a, 32b is maintained, and the combined element 36 remains at or near the near-field boundary of the antenna 34. In the case of a cylindrical reflector, it may be desirable to form each combined dielectric element as a post 38, 40 physically suspended in front of the radar sensor 10, as shown in FIG. 6A. The post 38 is detailed in FIG. 6B, where the surface 38a corresponds to the element 32a of FIG. 5, and the surface 38b corresponds to the element 32b of FIG. 5.

In summary, the present invention provides a simple and inexpensive adaptation device that enables a fixed beam planar antenna radar sensor to achieve an extended field-of-view for applications requiring a wide-angle zone-of-coverage, while also compensating for anomalies due to mounting variations (skewed, off-axis or de-centered patterns, for example), for pattern displacement due to physical separation of the transmit and receive antennas, and dielectric films such as the vehicle bumper fascia 12. While the invention has been described in reference to the illustrated embodiment, it should be understood that various modifications will occur to persons skilled in the art, and radar systems including such modifications may fall within the scope of this invention, which is defined by the appended claims.

What is claimed is:

1. A near-field radar obstacle detection apparatus comprising:

a fixed beam planar radar antenna; and an adaptation device for shaping a transmitted or received radiation of said antenna, including a plurality of dielectric elements that individually constitute different surface portions of an imaginary idealized quasi-spherical or quasi-cylindrical reflector disposed substantially at a near-field boundary of said antenna.

2. The apparatus of claim 1, wherein said dielectric elements are supported by a radome that is otherwise transparent to the transmitted or received radiation.

3. The apparatus of claim 2, wherein said dielectric elements are insert-molded into said radome.

4. The apparatus of claim 1, wherein two or more of said dielectric elements are combined about a diffraction point of said antenna to form a single multi-faceted dielectric element disposed substantially at said near-field boundary.

5. The apparatus of claim 1, wherein said idealized reflector is quasi-cylindrical, and said dielectric elements are defined by different surface portions of a post disposed substantially at said near-field boundary.

6. The apparatus of claim 1, wherein said adaptation device compensates for off-axis or off-center orientation of said antenna.

7. The apparatus of claim 1, wherein said adaptation device extends a field-of-view of said antenna.

8. The apparatus of claim 1, wherein a radar antenna is mounted on a bumper of said vehicle, and said adaptation device is supported on a fascia that surrounds said bumper.

* * * * *